March 17, 1953     W. E. DUERINGER     2,631,919
CHART PAD FOR RECORDING METERS

Filed May 8, 1947     3 Sheets—Sheet 1

INVENTOR.
WALTER E. DUERINGER
BY
Raymond D. Jenkins
ATTORNEY

March 17, 1953  W. E. DUERINGER  2,631,919
CHART PAD FOR RECORDING METERS

Filed May 8, 1947  3 Sheets-Sheet 2

*INVENTOR.*
WALTER E. DUERINGER
BY
Raymond W Junkins
*ATTORNEY*

March 17, 1953 W. E. DUERINGER 2,631,919
CHART PAD FOR RECORDING METERS
Filed May 8, 1947 3 Sheets-Sheet 3

INVENTOR.
WALTER E. DUERINGER
BY
Raymond L. Junkins
ATTORNEY

Patented Mar. 17, 1953

2,631,919

UNITED STATES PATENT OFFICE 2,631,919

CHART PAD FOR RECORDING METERS

Walter E. Dueringer, Shaker Heights, Ohio, assignor to Bailey Meter Company, a corporation of Delaware Application May 8, 1947, Serial No. 746,660

1 Claim. (Cl. 346—137)

This invention relates to the arrangement of charts in the form of pads for use with recording meters.

It has been the customary practice to provide for certain types of recording meters, single charts which must be replaced at the ends of predetermined intervals of time. The chart is usually fixed to a member which causes it to move relative to a pen arm at a constant speed, and the pen arm is moved in accordance with a variable condition to mark upon the chart in a path indicating the variations of the condition with respect to time. If desired, the chart may be supported in a fixed position while a pen is moved in one direction over the chart at a constant speed and is moved in a direction normal to the first movement in accordance with variations of the condition. In either case it is necessary that the chart be positioned relative to the recording pen so that the point of engagement between them is located relative to time markings on the chart to correspond with the actual time. The period of time required in placing a chart in position and adjusting it relative to the pen to get a mark corresponding with time may be appreciable. If the operator is required to change the charts on many meters, a small saving of time in the changing of each chart would be well worth considering. Since the record is broken during the time a chart is being replaced, it is further desirable that the time of changing be made as short as possible. Of greatest importance, however, is that the pen must record upon the chart at the correct actual time, otherwise reference to a chart record for happenings at a certain time will be inaccurate.

An object of my invention is to provide an improved arrangement of charts for use with a recording meter. Another object is to provide a plurality of charts fixed together in pad form for use with a recording meter, the charts being arranged so that corresponding markings on each assume the same positions relative to a marking pen. Yet another object is to provide for a recording meter a plurality of charts held together by an adhesive material in the form of a pad and adapted to be removed one at a time from the pad without disturbing the other charts. Other objects will appear in the course of the following description.

In the accompanying drawings there are shown for purposes of illustration several forms which my invention may assume in practice.

Figure 1:
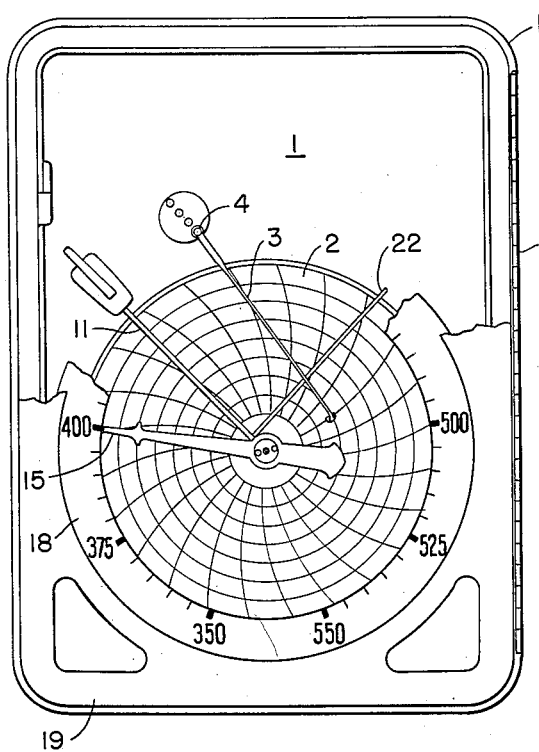
Fig. 1 is a front elevational view of a recording meter having one form of my improved chart pads mounted thereon.
Figure 2:
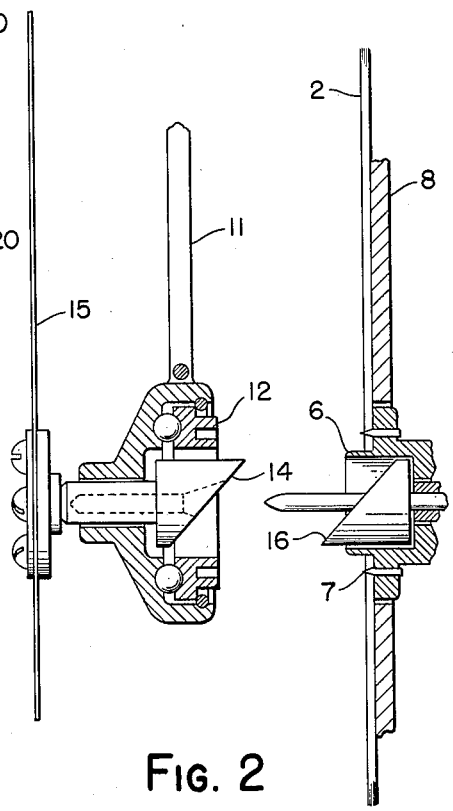
Fig. 2 shows an enlarged sectional view of supporting and driving means for the chart pad.

Referring to Fig. 1, it will be noted that I have shown a recording meter 1 in which a chart pad 2 is supported in such a position that the first chart of the pad may be marked upon by a pen carried by an arm 3 pivotally supported at 4. The chart pad is mounted, as shown in Fig. 2, upon a rotating hub 6, and pins 7 carried by the hub penetrate the chart pad so as to cause the latter to rotate with the hub. A plate 8 fixed to the meter casing provides a backing for the chart pad, and an arm 11 pivotally supported by the backing plate at the outer edges of the charts, overlies the pad and rotatably supports a member 12, which is adapted to press the pad against the pins 7 carried by the hub 6. The arm 11 also rotatably supports a member 14 carrying a pointer 15 and adapted to be coupled to a driving member 16 which is caused to operate with the pen arm in accordance with changes in a variable condition to be measured.

Figure 3:
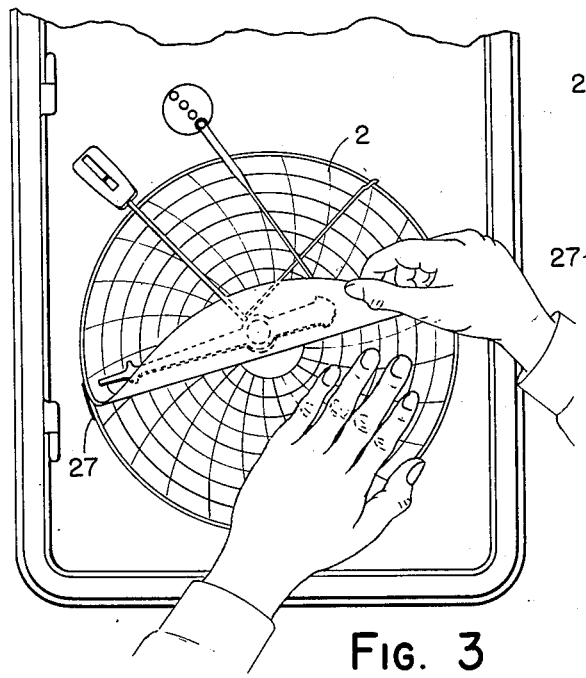
Fig. 3 is a view similar to Fig. 1 showing the manner in which charts are removed from the pad.

The pointer 15 cooperates with a scale 18 carried by a door 19 hinged to the meter casing at 20, and indicates on the scale the value of the condition while the pen is positioned on the chart by the arm 3 to record the value of such condition. The pivotal support for the arm 11 is such that the inner end of the arm may be swung away from the charts when the hinged door is open, and the members 12 and 14 are carried with it. Fixed to the arm is an element 22 extending between the charts and the pen arm 3 for lifting the latter away from the charts when the arm 11 is swung outwardly. With all parts moved away from the face of the outermost chart by the swinging of arm 11, it will be seen that the top chart may be grasped, as shown in Fig. 3, for removing it from the pad. The meter structure so far described forms no part of my invention, and is disclosed more fully in Patent 2,475,573 to Edward M. Smith et al. Further description of the same herein is therefore considered unnecessary.

Figure 4:
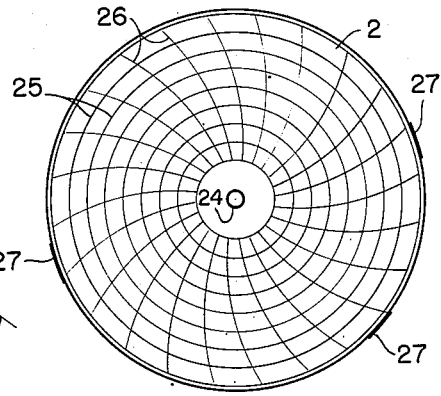
Fig. 4 is a front view of a chart pad adapted for use with the meter of Fig. 1.

The chart pad 2, as shown in Figs. 3 and 4, comprises a plurality of circular charts arranged in axial alignment and having an opening 24 at their centers for receiving the hub 6. Each chart is marked upon its face with concentric circles 25 and with radially extending arcuate lines 26. The lines 25 provide an indication of the value of the condition measured and the lines 26, swung on the same arc through which the recording pen moves, are uniformly spaced to provide an indication of the time at which the pen marks upon the chart. The charts are arranged in the pad so that corresponding lines 25 and 26 on each assume the same positions relative to the recording pen, and an adhesive material 27 is applied at one or more points to the edges of the charts for holding them against movement relative to each other. By grasping the top chart between points at which the adhesive material is applied, as shown in Fig. 3, the chart may be easily separated from the others when the measuring and supporting structure at its face is moved out of the way. When the pad is first placed in position on the meter it is adjusted so that the lines 26 on the outer chart assume the proper time positions relative to the pen. By continuing the rotation of the pad at a constant speed with the hub while the outer chart is being removed, it will be seen that the remaining charts will always be in the proper positions to be marked upon by the pen. No time is lost, as there is when single charts are used, in placing a new chart on the driving hub and adjusting its angular position relative to the pen.

Figure 5:
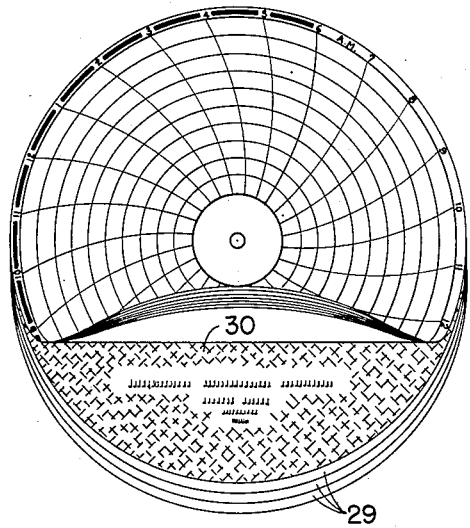
Fig. 5 shows an arrangement of charts in a pad similar to that of Fig. 4.
Figure 6:
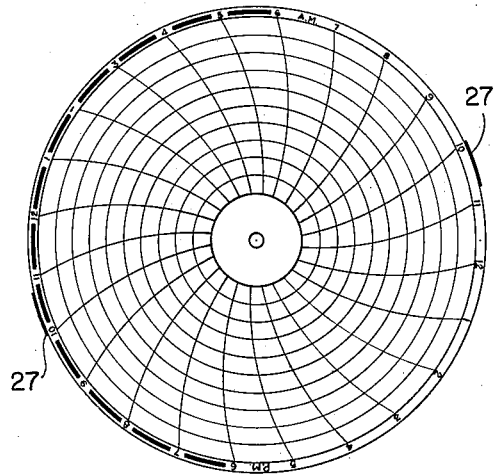
Fig. 6 is a front view of the chart pad of Fig. 5.

Each chart may be provided, as shown in Figs. 5 and 6, with time markings at its outer edge for the lines 26, and suitable markings may also be provided for indicating the time as a. m. and p. m. The pads may be made up of seven charts, one for each day of the week, or they may be made up, as suggested by Fig. 5, of several groups 29 of a predetermined number of charts. The adhesive material 27 may be applied to the chart edges for holding all of the charts of each group as well as the groups themselves in the proper positions. If desired, there may be placed between the groups of charts a colored sheet 30 to indicate when one group has been used and to facilitate a counting of the charts available for use.

Figure 7:
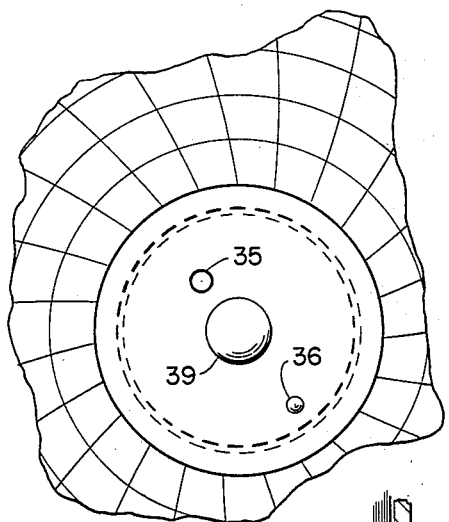
Fig. 7 is an enlarged fragmentary view in front elevation of another form of chart pad supported for rotation on a recording meter.
Figure 8:
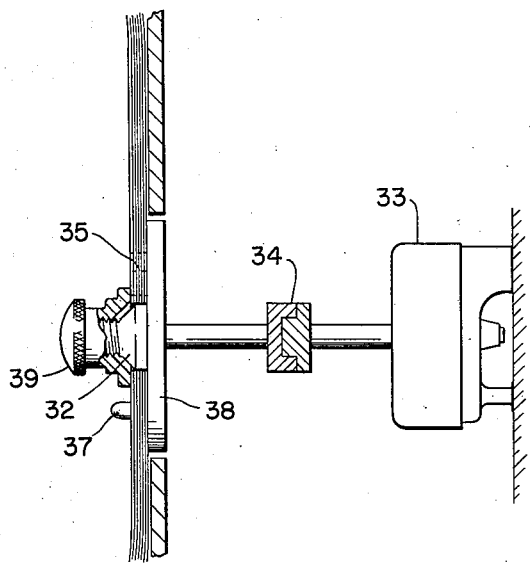
Fig. 8 is a side elevational view of means supporting and rotating the chart pad of Fig. 7.

In Figs. 7 and 8 there is shown a pad of charts having a central opening for receiving a hub 32 which is rotated at a constant speed by a driving mechanism 33 through a clutch 34. Formed in the pad at points spaced different distances radially from its center are openings 35 and 36, and an adhesive material may be applied to the edges of the charts at one or both of these openings for holding them together. The charts are, of course, in proper alignment with each other at this time. A pin 37 is shown fixed to a flange 38 on the hub in a position to be received in the opening 36 for preventing a slipping of the pad on the hub and for determining the angular position of the pad relative to the hub. With the openings 35, 36 spaced different distances from the center, the pad may be arranged on the hub only in a position to receive the pin in opening 36. If the hub is once adjusted so that the pad receives the pin 37 only when it is in the proper time position relative to the marking pen, then a continuous rotation of the hub makes it possible to change chart pads quickly without observing the point at which the pin engages the chart. Since the adhesive material may interfere with the reception of the pin 37 in the opening 36, it may be better to apply the adhesive at only the opening 35. The adjustment of the hub angularly for supporting the pad in the proper position may be accomplished initially by slipping the friction clutch 34. A thumb nut 39 is shown threaded on the hub into engagement with the pad for holding the latter in place. It will be understood that the driving mechanism 33 is designed to drive the hub 32 at a constant speed so as to effect one rotation of the chart in a predetermined period of time, such as a period of twenty-four hours. In this case, the lines 26 on the charts may be spaced as shown to represent periods of one hour each.

Figure 9:
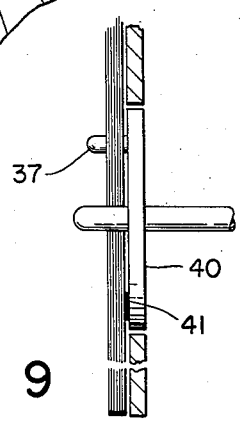
Fig. 9 shows another form of supporting and rotating means for a chart pad.

Fig. 9 shows a pad of charts which may be held together by an adhesive applied to their edges, as in Fig. 4. An opening in the pad is adapted to receive a projecting portion of a rotating hub 40, and an adhesive or gum-like material 41 is shown for holding the pad in place on the hub. A pin 37 is fixed to the hub for rotation therewith and is received in an opening in the chart pad for effecting a rotation of the latter with the hub, and for determining its position with respect to a marking pen.

Figures 10, 11:
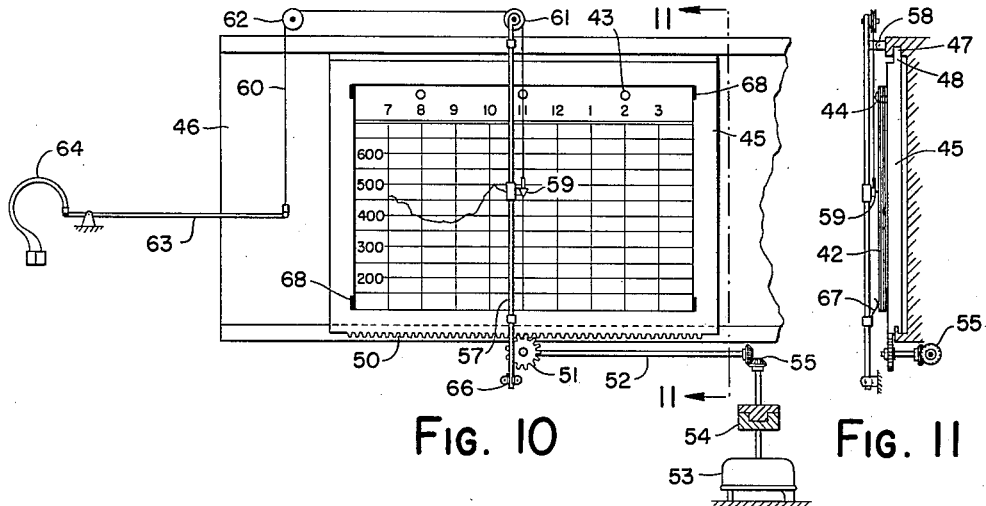
Fig. 10 shows a rectangular shaped chart pad supported for bodily movement relative to a marking pen.
Fig. 11 is a view taken on the plane of the line 11—11 of Fig. 10.

Figs. 10 and 11 show a rectangular shaped chart pad 42 having openings 43 along its upper edge for receiving pins 44 fixed to a supporting plate 45. A frame 46 is provided with guideways 47 slideably receiving portions 48 of the plate for guiding the latter in a path extending longitudinally of the charts. Formed along the lower edge of the plate 45 is a rack 50 with which a pinion gear 51 meshes, and a shaft 52 is driven by a power mechanism 53 through a clutch 54 for effecting rotation of the gear 51 through gears 55. Extending across the chart pad is a rod 57 which is pivotally supported by the frame 46 at the point 58. Slideably mounted upon the rod is a marking pen 59, and a cord 60 is attached to the pen and extends around pulleys 61 and 62 to be connected to a pivoted arm 63, which is actuated by a device 64, such as a Bourdon tube, responsive to a condition to be measured. The pen 59 is moved in one direction along the rod 57 by its connection to the device 64 through the cord 60 and the arm 63, and is moved in the opposite direction by its weight or the weight of the sliding pen support. Engagement between the outer chart and the pen is obtained when the rod 57 is moved to a position parallel to the pad, and a releasable catch 66 is provided for holding the rod in such position. Carried by the rod 57 is a spring member 67 engageable with the pad for holding the latter in position on the plate 45. An adhesive material 68 may be applied to the edges of the charts, as at the corners, for holding them together in pad form.

Figures 12, 13:
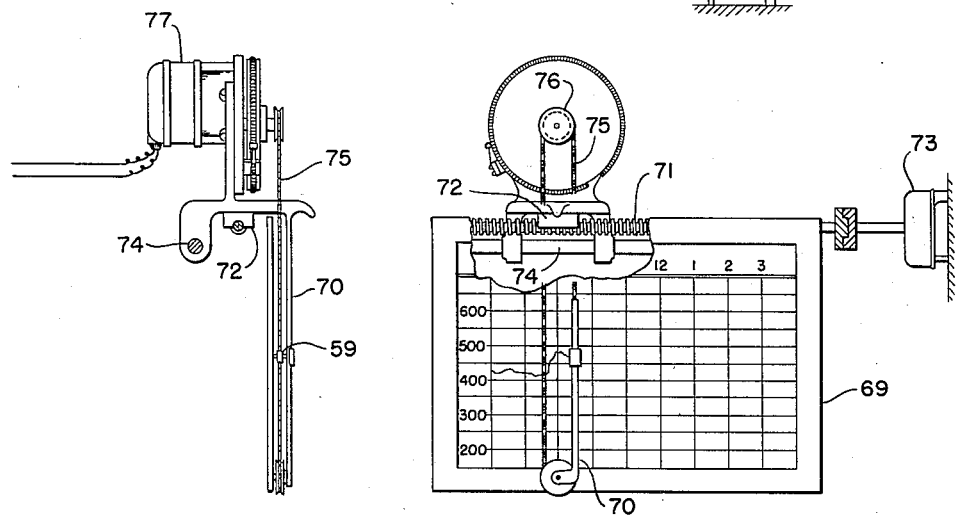
Fig. 12 is a front elevational view, with a portion broken away to facilitate illustration, of a recording meter on which a chart pad like that of Fig. 10 is supported in a fixed position while a pen is moved both longitudinally and transversely thereof.
Fig. 13 is an end view of the recording mechanism shown in Fig. 12.

In Figs. 12 and 13 there is shown a chart pad like that of Fig. 10 mounted upon a stationary supporting plate 69. The pen 59 in this case is slideably supported by a frame 70 which is moved longitudinally of the charts at a constant speed by a feeding mechanism comprising a feed screw 71 meshing with a half nut 72 on the frame and driven by a mechanism 73. The frame is slideably supported by a rod 74 and is adapted to be swung about the rod in a plane perpendicular to the chart pad. A cord 75 is connected to the pen and extends around a pulley 76 which is driven by a motor 77 in accordance with changes in a condition to be measured. After the pen has been moved across the chart to produce a record of the condition, the frame 70 may be swung about the rod 64 away from the pad so that the outer chart may be removed. The frame may then be moved manually along the rod 74 until the pen is in a position to start a record on the next chart.

Figures 14, 15:
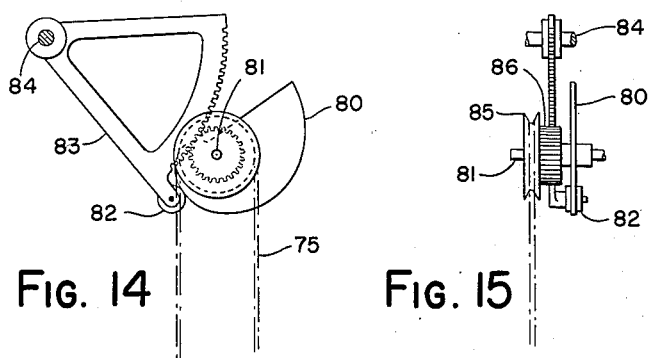
Figs. 14 and 15 show another form of driving means for the pen of Fig. 12.

Figs. 14 and 15 show another form of driving mechanism for positioning the pen on the chart with changes in the condition. In this case a cam 80 is fixed to a shaft 81 driven by the motor 77 of Fig. 13. The cam 80 engages a roller 82 carried by a sector 83, which is pivotally mounted on a shaft 84. A pulley 85 is fixed to a pinion gear 86 loosely mounted on the shaft 81 and meshing with teeth on the sector 83. The cord 75 extends around the pulley 85 for positioning the pen 59. It will be seen that by positioning the pen through the cam 80, various characteristics of the system may be modified by the shaping of the cam, or the pen may be made to record directly any of the changes of the condition.

While there are described in this application several forms which my invention may assume in practice, it will be understood that it may be modified and embodied in various other forms without departing from its spirit or the scope of the appended claim.

Certain features of my invention, disclosed but not claimed herein, are disclosed and claimed in my divisional application S. N. 28,002 filed May 19, 1948.

What I claim as new, and desire to secure by Letters Patent of the United States, is:

A chart pad adapted for use with a recording meter and comprising, in combination, a plurality of circular charts having concentric circles and arcuate radial lines marked upon their faces, said charts arranged coaxially with each other and having corresponding radial lines overlying each other, an adhesive material applied to and spanning the edges of said charts only at a plurality of widely spaced points for holding them together in the form of a pad, and a central opening through said pad of charts for receiving an element supporting them in positions to be marked upon by a recording pen.

WALTER E. DUERINGER.

REFERENCES CITED

The following references are of record in the file of this patent:

UNITED STATES PATENTS

| Number | Name | Date |
|---|---|---|
| 245,625 | Green | Aug. 16, 1881 |
| 286,111 | Bowman | Oct. 2, 1883 |
| 506,988 | Fecht | Oct. 17, 1893 |
| 1,054,720 | Shaffner | Mar. 4, 1913 |
| 1,583,536 | Egy et al | May 4, 1926 |
| 1,594,563 | Robinson | Aug. 3, 1926 |
| 1,618,774 | Monnig | Feb. 22, 1927 |
| 1,818,630 | Lamberty | Aug. 11, 1931 |
| 2,210,380 | Potter | Aug. 6, 1940 |

FOREIGN PATENTS

| Number | Country | Date |
|---|---|---|
| 9,787 | Great Britain | Dec. 17, 1895 |